ated Oct. 16, 1956

2,767,183
6-BENZYLPYRIMIDINES

George H. Hitchings, Tuckahoe, and Peter Byrom Russell, Crestwood, N. Y., assignors to Burroughs Wellcome & Co. (U. S. A.) Inc., Tuckahoe, N. Y., a corporation of New York No Drawing. Application February 26, 1953,
Serial No. 339,183

Claims priority, application Great Britain March 18, 1952

8 Claims. (Cl. 260—256.4)

This invention relates to novel chemical compounds having unusual properties and to the method of preparing them. More particularly, the invention deals with a new class of 5-aryl-2,4-diaminopyrimidines substituted in the 6-position of the pyrimidine ring by an aralkyl group. These new compositions of matter have valuable properties as inhibitors of growth of certain microorganisms and are active in the treatment of malarial infections and other disorders.

The compounds of the present invention may be prepared conveniently by the reaction of the enol ether of an a-phenylacetylphenylacetonitrile with guanidine essentially as represented by the following reaction.

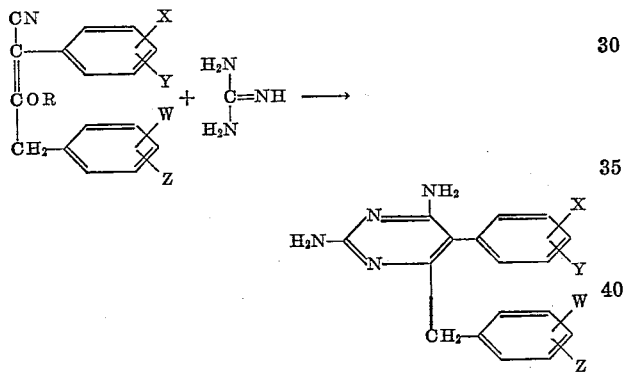

wherein W, X, Y and Z are radicals selected from the class consisting of halogen, alkyl, alkoxy and hydrogen and R is a lower alkyl radical.

The following examples illustrate the method of preparing the novel derivatives as applied to particular members falling within the group and are not to be regarded as restricting the general scope of the invention.

EXAMPLE 1

*2,4-diamino-5-phenyl-6-benzylpyrimidine*

15 g. of phenylacetylphenylacetonitrile (prepared by the method of E. V. Meyer, J. Pr. Chem. (II) 52, 115 (1895)) was heated with ethyl orthopropionate under a short column. The low boiling material was removed. After one hour the ortho ester was removed in vacuo and the residue reacted with guanidine (from 9.5 g. guanidine hydrochloride and 2.3 g. sodium) in ethanol (100 ml.) overnight. The alcoholic solution was diluted with water and basified with sodium hydroxide solution. The precipitate was filtered and recrystallized from benzene petrol ether, and finally from aqueous ethanol, needles, M. P. 213–215°.

EXAMPLE 2

*2,4-diamino-5-p-chlorophenyl-6-benzylpyrimidine* a-Phenylacetyl-p-chlorophenylacetonitrile was prepared by condensing ethyl phenylacetate with p-chlorophenylacetonitrile essentially as described by V. Meyer above cited. After recrystallization from benzene it melted at 130°.

2,4-diamino-5-p-chlorophenyl-6-benzylpyrimidine was prepared from the above ketonitrile in a manner similar to that described above (Example 1). After recrystallization from ethanol it formed prisms, M. P. 235–236°.

EXAMPLE 3

*2,4-diamino-5-p-chlorophenyl-6-p-chlorobenzyl-pyrimidine* a-p-Chlorophenyl-p-chlorophenylacetonitrile was preprepared by condensing ethyl p-chlorophenylacetate and p-chlorophenylacetonitrile. After recrystallization from ether petroleum ether it melted at 84°.

The above nitrile (18 g.) was treated with diazomethane (from 20 g. nitrosomethylurea) in ether. When the evolution of nitrogen had ceased the ether was evaporated and guanidine (from 9.5 g. hydrochloride) in ethanol (100 ml.) added. The solution was refluxed for 12 hours. The solid which formed was filtered off and recrystallized from ethanol, M. P. 241–243°.

EXAMPLE 4

*2,4-diamino-5-p-chlorophenyl-6-(3'4' dimethoxybenzyl) pyrimidine* a - (3,4 dimethoxyphenylacetyl) - p - chlorophenylacetonitrile was prepared by the condensation of ethyl homoveratrate with p-chlorophenylacetonitrile in the presence of sodium hydroxide. After recrystallization from ether-petroleum ether it melted at 96–97°.

The above keto nitrile was treated with diazomethane (from 10 g. nitrosomethyl urea) in ether. The oily product obtained by evaporation of the ether and diazomethane was reacted with guanidine (from 9.5 g. hydrochloride) in ethanol (100 ml.). After 12 hours the ethanolic solution was diluted with water and the precipitate collected on a filter. After recrystallization from ethanol it melted at 221°.

EXAMPLE 5

*2,4-diamino-5-(3'4' dichlorophenyl)-6-benzylpyrimidine* a - Phenylacetyl - 3,4 - dichlorophenacetonitrile (plates from benzene, M. P. 124°) (25 g.) was heated with ethyl orthoacetate (50 ml.) under a short column. When all the low boiling material has been distilled the excess ethyl orthoacetate was removed in vacuo. The residual oil was reacted with guanidine (from 9.5 g. of the hydrochloride) in ethanol (125 cc.) on the steam bath for 16 hours. The separated solid was filtered and recrystallized from ethanol. It formed small colorless plates, M. P. 217°.

EXAMPLE 6

*2,4-diamino-5-p-tolyl-6-benzylpyrimidine a-phenylacetyl-p-tolylacetonitrile*

To a solution of sodium (3.5 g.) in ethanol (100 mls.) was added a mixture of p-tolylacetonitrile (20 g.) and ethyl phenylacetate (25 g.). After standing at room temperature for several hours the mixture was heated on a steam bath overnight. After cooling the reaction mixture was poured into water and the aqueous solution after removal of any oil was acidified with dilute sulfuric acid. The separated oil crystallized almost at once. After recrystallization from ether-ligroin it formed colorless needles. M. P. 110°.

The above keto-nitrile (9 g.) was refluxed with toluene (90 ml.) and iso-butanol (9 ml.) until no more water separated, then p-toluenesulfonic acid (0.5 g.) was added and refluxing again continued until the evolution of water again ceased. Then the toluene and iso-butanol were removed in vacuo and the residue reacted with guanidine (from 9.5 g. of the hydrochloride) in ethanol (100 mls.). The product, after several recrystallizations from aqueous ethanol, melted at 231°.

EXAMPLE 7

*2,4-diamino-5-m-fluorophenyl-6-o-chlorobenzylpyrimidine a-o-chlorophenylacetyl-m-flurophenylacetonitrile*

To a solution of sodium (3 g.) in ethanol (75 ml.) was added a mixture of m-fluorophenylacetonitrile (17 g.) and ethyl o-chlorophenylacetate (25 g.). The mixture was refluxed after standing for one hour. After 16 hours the product was worked up as under (*a*) in the previous example. After recrystallization from ether-ligroin it melted at 110–111°. The above keto-nitrile (14 gms.) was converted to the isobutyl ether as described in (*b*) above. The enol ether was reacted with guanidine in the usual manner to give of the desired pyrimidine, M. P. 247°.

EXAMPLE 8

*2,4-diamino-5-(3′4′-dimethoxyphenyl)-6-benzyl- pyrimidine*

(a) *a - 3′,4′ - dimethoxyphenyl-a-phenylacetylacetoni- trile*.—To a solution of sodium (4.6 g.) in ethanol (100 mls.) was added a mixture of 3,4-dimethoxyphenylace- tonitrile (35.4 g.) and ethyl phenylacetate (22.8 g.). After standing overnight the mixture was refluxed for 5 hours. After working up in the usual manner the keto nitrile was obtained as a noncrystalline gum.

(b) The gum from the above condensation was dis- solved in ether (200 ml.) and diazomethane (ca. 4.2 g. from 15 g. nitrosomethyl urea) in ether (250 ml.) was added. There was a violent evolution of gas. After standing overnight the ether was evaporated and the residue reacted with guanidine (from 14.25 g. of hydro- chloride and 3.45 g. sodium in ethanol (200 ml.)). Heat on steam bath 7 hours. Pour into water and make the solution alkaline with sodium hydroxide. The pre- cipitate was filtered and recrystallized from ethanol when the pyrimidine was obtained as needles, M. P. 219° (17.5 g.).

For purposes of this invention alkylamino groups are equivalents of the unsubstituted amino groups at the 2 and 4 positions of the pyrimidine ring and use of such alter- native groupings is optional.

We claim:

1. A method of preparing 5-aryl-6-benzyl-2,4-diamino- pyrimidines which comprises reacting an enol ether of an a-phenylacetylphenylacetonitrile with guanidine.

2. A method of preparing 5-aryl-6-benzyl-2,4-diamino- pyrimidines of the formula

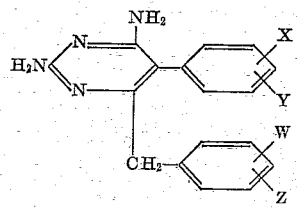

wherein W, X, Y and Z are radicals selected from the class consisting of halogen, lower alkyl, lower alkoxy and hydrogen, which comprises reacting a compound of the formula

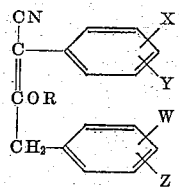

with guanidine wherein R is a lower alkyl radical.

3. A 6-benzylpyrimidine of the formula

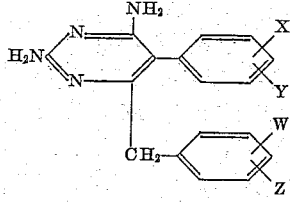

wherein W, X, Y and Z are selected from the class con- sisting of hydrogen, lower alkyl, lower alkoxy and halogen.

4. 2,4-diamino-5-phenyl-6-benzylpyrimidine.

5. 2,4-diamino-5-p-chlorophenyl-6-benzylpyrimidine.

6. 2,4 - diamino - 5 - p - chlorophenyl-6-p-chlorobenzyl- pyrimidine.

7. 2,4 - diamino - 5 - p-chlorophenyl-6-(3′4′ dimethoxy- benzyl)-pyrimidine.

8. 2,4-diamino-5-(3′4′ dichlorophenyl)-6-benzylpyrimi- dine.

References Cited in the file of this patent

UNITED STATES PATENTS

| | | |
|---|---|---|
| 2,435,002 | Hartmann et al. | Jan. 27, 1948 |
| 2,491,658 | Gresham et al. | Dec. 20, 1949 |
| 2,688,019 | Hitchings et al. | Aug. 31, 1954 |
| 2,691,655 | Hitchings et al. | Oct. 12, 1954 |

OTHER REFERENCES

Falco et al.: Brit. J. Pharmacol and Chemotherapy 6, 188 (1951).